United States Patent
Iannuzzi et al.

(10) Patent No.: US 11,880,875 B2
(45) Date of Patent: Jan. 23, 2024

(54) SYSTEMS AND METHODS FOR PROVIDING PRODUCT RECOMMENDATIONS

(71) Applicant: The Toronto-Dominion Bank, Toronto (CA)

(72) Inventors: Davide Iannuzzi, North York (CA); Jeffrey MacDonald, Ottawa (CA); Goran Ilkanizadeh, Ottawa (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

(21) Appl. No.: 17/220,203

(22) Filed: Apr. 1, 2021

(65) Prior Publication Data
US 2022/0318882 A1 Oct. 6, 2022

(51) Int. Cl.
| | | |
|---|---|---|
| *G06Q 30/00* | (2023.01) | |
| *G06Q 30/0601* | (2023.01) | |
| *G06Q 20/34* | (2012.01) | |
| *G06Q 50/00* | (2012.01) | |

(52) U.S. Cl.
CPC ....... *G06Q 30/0631* (2013.01); *G06Q 20/351* (2013.01); *G06Q 30/0629* (2013.01); *G06Q 50/01* (2013.01)

(58) Field of Classification Search
CPC .............. G06Q 30/0631; G06Q 20/351; G06Q 30/0629; G06Q 50/01
USPC ................................................ 705/26.1–27.2
See application file for complete search history.

(56) References Cited

U.S. PATENT DOCUMENTS

| | | | |
|---|---|---|---|
| 10,007,915 B2 | 6/2018 | Singh et al. | |
| 10,181,126 B2 | 1/2019 | Fischer et al. | |
| 10,546,326 B2 | 1/2020 | Publicover et al. | |
| 10,769,672 B2 | 9/2020 | Wical | |
| 2004/0230481 A1* | 11/2004 | Bushold | G06Q 20/20 705/16 |
| 2011/0066497 A1* | 3/2011 | Gopinath | G06Q 30/02 705/14.53 |

(Continued)

OTHER PUBLICATIONS

J. P. Shim and R. Taylor, "Purchase-Based Analytics and Big Data for Actionable Insights," in IT Professional, vol. 21, No. 5, pp. 48-56, 1 Sep.-Oct. 2019, doi: 10.1109/MITP.2019.2897658. (Year: 2019).*

*Primary Examiner* — Anand Loharikar
(74) *Attorney, Agent, or Firm* — Rowand LLP (57) ABSTRACT

A processor-implemented method is disclosed. The method includes: receiving input representing a request to connect a data record associated with a value transfer card with a first social networking account on a social networking platform, the request including authentication information for the first social networking account; transmitting, to a computing system associated with the social networking platform, a request to obtain social media data associated with the first social networking account; receiving, from the computing system associated with the social networking platform, the requested social media data; generating a personal preference profile based on the obtained social media data; obtaining, from computing systems associated with one or more third-party affiliate entities, product data for products that are exchangeable with stored value associated with the data record; and generating recommendations of product offers based on filtering the obtained product data using the personal preference profile.

16 Claims, 7 Drawing Sheets

(56) References Cited

U.S. PATENT DOCUMENTS

| | | |
|---|---|---|
| 2012/0101881 A1 | 4/2012 | Taylor et al. |
| 2012/0191525 A1* | 7/2012 | Singh .................... G06Q 30/02 |
| | | 705/14.27 |
| 2012/0215614 A1 | 8/2012 | Hochstatter et al. |
| 2014/0164062 A1 | 6/2014 | Wen et al. |
| 2014/0310080 A1 | 10/2014 | Salmon et al. |
| 2015/0006224 A1 | 1/2015 | Arditi et al. |
| 2015/0262245 A1 | 9/2015 | Arvanitis |
| 2016/0134720 A1 | 5/2016 | Pochic et al. |
| 2016/0180403 A1 | 6/2016 | Ganesh et al. |
| 2017/0193542 A1 | 7/2017 | Rapaka et al. |
| 2018/0158100 A1 | 6/2018 | Barak et al. |
| 2020/0134651 A1 | 4/2020 | Perry et al. |

* cited by examiner

SYSTEMS AND METHODS FOR PROVIDING PRODUCT RECOMMENDATIONS

TECHNICAL FIELD

The present application relates to data processing and, more particularly, to systems and methods for providing product recommendation data to entities in a networked environment.

BACKGROUND

Value transfer cards, such as credit or debit cards, may be used by customers for various types of transactions. Typically, these cards are issued by financial institutions (e.g., banks) to their customers. A value transfer card may allow the cardholder to collect "rewards points". For example, when a value transfer card is used to pay for purchases, the account associated with the card may accumulate "rewards points" on certain eligible purchase transactions. Such "rewards points" may be redeemed as cash rewards, points rewards, travel rewards, or a combination thereof.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

In an aspect, a computing device is disclosed. The computing device includes a processor, a communications module coupled to the processor, and a memory coupled to the processor. The memory stores instructions that, when executed, configure the processor to: receive input representing a request to connect a data record associated with a value transfer card with a first social networking account on a social networking platform, the request including authentication information for the first social networking account; transmit, to a computing system associated with the social networking platform, a request to obtain social media data associated with the first social networking account; receive, from the computing system associated with the social networking platform, the requested social media data; generate a personal preference profile based on the obtained social media data; obtain, from computing systems associated with one or more third-party affiliate entities, product data for products that are exchangeable with stored value associated with the data record; and generate recommendations of product offers based on filtering the obtained product data using the personal preference profile.

In some implementations, the social media data may include at least one of activity log data, contacts data, subscriptions data, or personalized wish list data and the personal preference profile may be generated based on product preference information indicated in the social media data.

In some implementations, filtering the obtained product data may include selecting a subset of the products based on product preference information indicated in the personal preference profile.

In some implementations, selecting the subset of the products may include assigning, for each of one or more of the products, a preference score representing a preference for the product based on the personal preference profile.

In some implementations, generating the recommendations of product offers may include: detecting at least one trigger condition associated with one or more products in the selected subset; and in response to detecting the at least one trigger condition, providing the recommendations of product offers to a client device associated with the data record.

In some implementations, detecting the at least one trigger condition may include detecting that a product attribute associated with one of the products has changed.

In some implementations, detecting the at least one trigger condition may include detecting a sale condition associated with one of the products.

In some implementations, the personal preference profile may be generated based on at least one of historical transaction data associated with the value transfer card or value-to-product exchange history associated with the data record.

In some implementations, the instructions, when executed, may further configure the processor to: identify a plurality of products that are exchangeable with stored value associated with the data record; and present, on a client device associated with the data record, a product comparison view for comparing the identified plurality of products.

In some implementations, presenting the product comparison view may include arranging a display of the plurality of products based on an order of preference associated with the plurality of products.

In another aspect, a computer-implemented method is disclosed. The method includes: receiving input representing a request to connect a data record associated with a value transfer card with a first social networking account on a social networking platform, the request including authentication information for the first social networking account; transmitting, to a computing system associated with the social networking platform, a request to obtain social media data associated with the first social networking account; receiving, from the computing system associated with the social networking platform, the requested social media data; generating a personal preference profile based on the obtained social media data; obtaining, from computing systems associated with one or more third-party affiliate entities, product data for products that are exchangeable with stored value associated with the data record; and generating recommendations of product offers based on filtering the obtained product data using the personal preference profile.

In yet another aspect, a non-transitory computer readable storage medium is disclosed. The computer readable storage medium contains instructions thereon which, when executed by a processor, configure the processor to: receive input representing a request to connect a data record associated with a value transfer card with a first social networking account on a social networking platform, the request including authentication information for the first social networking account; transmit, to a computing system associated with the social networking platform, a request to obtain social media data associated with the first social networking account; receive, from the computing system associated with the social networking platform, the requested social media data; generate a personal preference profile based on the obtained social media data; obtain, from computing systems associated with one or more third-party affiliate entities, product data for products that are exchangeable with stored value associated with the data record; and generate recommendations of product offers based on filtering the obtained product data using the personal preference profile.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Example embodiments of the present application are not limited to any particular operating system, system architecture, mobile device architecture, server architecture, or computer programming language.

Value transfer cards, such as payment cards, can be used for making purchases at a point-of-sale or to access ATMs for account-related transactions. A value transfer card may be connected to one or more accounts (such as banking accounts) storing data and/or resources that are accessible to the cardholder. For example, a value transfer card may be associated with a primary, or default, account and a number of secondary accounts that can be used for specific transactions (e.g., foreign currency transactions). Any transaction that is initiated using a value transfer card may access resources of one of the accounts that are connected to the value transfer card.

A value transfer card may be associated with a loyalty program that is designed to reward cardholders for use of their card. When a value transfer card is used for transactions, such as purchases, bill payments, and the like, an account associated with the card may be credited with "loyalty points". The loyalty points may thus be considered as incentives for using the value transfer card. These points can, in turn, be redeemed for one or more of a plurality of defined rewards that are available to the cardholder for selection. The rewards may be in the form of products (e.g., merchandise, gift cards, services, etc.) offered by third-party entities that are affiliated with the loyalty program, or they may be exchanged for loyalty credits of other rewards programs.

Loyalty program implementations are typically limited in user engagement and interactivity. A loyalty program may allow members to access rewards information for rewards that are available for claiming, but may not support customization by the members. Given the static nature of loyalty systems, members may not be aware of rewards that they are eligible for. Even if members do remember to access their loyalty program accounts, they may need to extensively browse a suite of offers in order to find their desired rewards. For example, members may need to manually search catalogs that list products for which their loyalty points can be redeemed. Such limitations may make loyalty programs less attractive for cardholders, leading to low redemption rates and, ultimately, less interest in participation by third-party affiliates.

Various solutions for addressing the aforementioned technical challenges associated with loyalty systems are described in the present disclosure.

Figure 1:
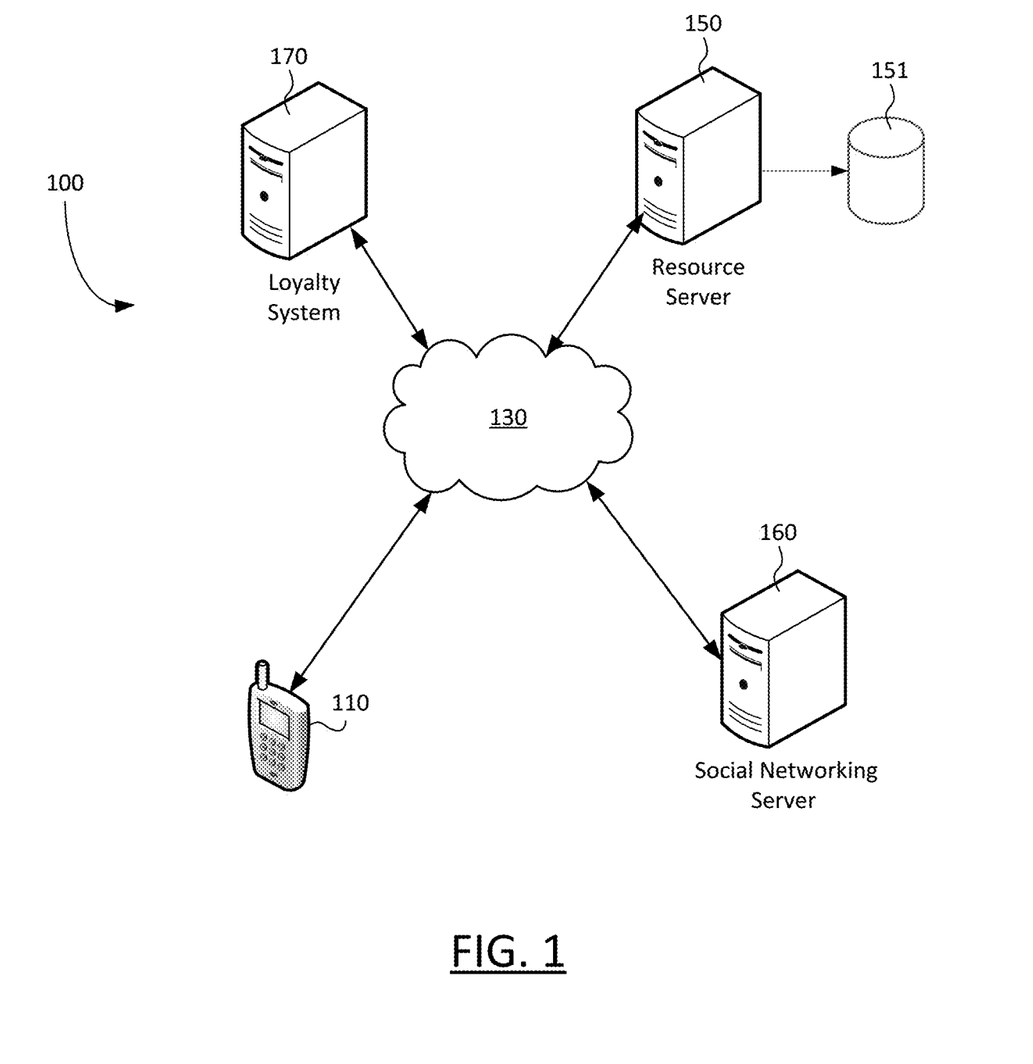
FIG. 1 is a schematic diagram illustrating an operating environment of an example embodiment.

Reference is first made to FIG. 1, which is a schematic diagram illustrating an exemplary computing environment 100 consistent with certain disclosed embodiments. As shown in FIG. 1, the computing environment 100 may include one or more client devices 110, a resource server 150, a database 151 associated with the resource server 150, a social networking server 160, a loyalty system 170, and a communications network 130 connecting one or more of the components of computing environment 100.

The resource server 150 (which may also be referred to as a server computer system) and the client devices 110 communicate via the network 130. In at least some embodiments, the client device 110 is a computing device. The client device 110 may take a variety of forms including, for example, a mobile communication device such as a smartphone, a tablet computer, a wearable computer such as a head-mounted display or smartwatch, a laptop or desktop computer, or a computing device of another type. The client device 110 is associated with a client entity (e.g., an individual, an organization, etc.) having resources that are managed by or via the resource server 150. For example, the resource server 150 may be a financial institution server and the client entity may be a customer of a financial institution operating the resource server 150. The client device 110 may store software instructions that cause the client device to establish communications with the resource server 150 and, in at least some embodiments, a loyalty system 170.

The resource server 150 may track, manage, and maintain resources, make lending decisions, and/or lend resources to a client entity associated with the client device 110. The resources may, for example, be computing resources, such as memory or processor cycles. In at least some embodiments, the resources may include stored value, such as fiat currency, which may be represented in a database. For example, the resource server 150 may be coupled to a database 151, which may be provided in secure storage. The secure storage may be provided internally within the resource server 150 or externally. The secure storage may, for example, be provided remotely from the resource server 150. For example, the secure storage may include one or more data centers. The data centers may, for example, store data with bank-grade security.

The database 151 may include data records for a plurality of accounts and at least some of the records may define a quantity of resources associated with the client entity. For example, the client entity may be associated with an account having one or more records in the database 151. The records may reflect a quantity of stored resources that are associated with the client entity. Such resources may include owned resources and, in at least some embodiments, borrowed resources (e.g., resources available on credit). The quantity of resources that are available to or associated with the client entity may be reflected by a balance defined in an associated data record such as, for example, a bank balance.

In at least some embodiments, the database 151 may store various types of information in connection with customers of a business entity that administers the resource server 150. For example, the database 151 may store customer profile data and financial account data associated with customers. The customer profile data may include, without limitation, personal information of registered customers, authentication credentials of the customers, account identifying information (e.g., checking account, savings account, revolving credit line, etc.), and information identifying services (e.g., banking services, investment management services, etc.) and/or programs (e.g., loyalty programs) that are offered to the customers by the business entity. The financial account data may include account balances, historical transaction data, credit score(s), mortgage balances, investment account balances, and portfolio data relating to portfolios of investments that are held by customers, among others.

The business entity associated with the resource server 150 may provide services that are accessible to the client entity. For example, the business entity may provide account management services, financial transaction services, investment management services, and the like for the client entity. In at least some embodiments, the business entity may issue value transfer cards (e.g., credit, charge or debit cards) to its customers, including the client entity. In particular, the resource server 150 may be associated with a value transfer card issuer. The value transfer cards issued by the business entity may be associated with the resource accounts of the customers at the resource server 150. For example, the value transfer cards may be used by customers to access resources of their resource accounts.

The resource server 150 may be configured to provide a user interface that allows client devices 110 to access the services offered by the business entity. By way of example, the resource server 150 may be configured to provide a website or web-based portal which can be accessed via the client devices 110. The website (or portal) may include web content corresponding to various services offered by the business entity, and the resource server 150 may provide the web content for display on the client devices 110. As another example, the resource server 150 may be associated with a software application which may be installed and/or run on the client devices 110. More specifically, the resource server 150 may implement the backend of an application (e.g., mobile application) that is used for accessing the services offered by the business entity.

The computing environment 100 includes at least one social networking server 160. A social networking server 160 is a computer system that is associated with one or more providers of social media and social networking services (e.g., Facebook™, Twitter™, Pinterest™, LinkedIn™, etc.). The social networking server 160 may be configured to maintain social networks having members (e.g., individuals, businesses, etc.) that are linked together through one or more member-established relationships. A provider of a social network associated with the social networking server 160 may establish an application programming interface (API) through which the social networking server 160 may receive data from devices associated with members of the social network and through which social media data may be broadcast to the member devices. The social media data includes data relating to social media activity of the members. For example, the social media data may include reactions data (e.g., likes) associated with content on the social network, messages (e.g., direct messages), posts, status updates, shares, tweets, comments, and the like. The social media data may be transmitted to member devices at regular intervals or in response to polling requests from member devices. In particular, social media data may be obtained from a social networking server 160 via a social media API that allows for reading from and writing data into the social network.

The computing environment 100 also includes a loyalty system 170. The loyalty system 170 is implemented by a computing system, such as a server computer. The loyalty system 170 is associated with a loyalty program. In some embodiments, the loyalty system 170 may be managed by a business entity that is associated with the resource server 150. For example, the business entity may administer one or more loyalty programs for its customers, and the loyalty system 170 may be associated with at least one of the loyalty programs. In particular, the loyalty system 170 may be implemented by or as part of the resource server 150. The loyalty programs may, for example, be linked to value transfer cards that are offered to customers of the business entity. A customer may register or sign up for a value transfer card that is offered by the business entity, and the value transfer card can be connected to a loyalty program. As the customer uses the value transfer card (e.g., for transactions, such as purchases, bill payments, etc.), the loyalty system 170 may credit a loyalty program account associated with the customer.

The loyalty system 170 may perform various functions relating to a loyalty program. In at least some embodiments, the loyalty system 170 may track, manage, and maintain loyalty credits information for a plurality of accounts associated with the loyalty program. For example, the loyalty system 170 may store or have access to a database containing data records associated with loyalty program accounts of customers. The loyalty system 170 may be configured to update account data for the loyalty program accounts. In particular, the account data may be updated based on information relating to transactions conducted by the customers. For example, the loyalty program accounts may be linked to customers' value transfer cards, and account data for the loyalty program accounts may be updated in real-time (or near real-time) when transactions are conducted using the value transfer cards.

In some embodiments, the loyalty system 170 may perform analyses of current or historical transactions of customers to determine whether loyalty offers (or "rewards" offers) can be provided or generated for the customers. In particular, the loyalty system 170 may be configured to determine whether loyalty offers are available for a customer based on the customer's current transaction(s), historical transactions, or both. The loyalty offers may include offers of products for which loyalty credits can be redeemed. For example, loyalty credits may be redeemed to receive products free-of-charge or they may be applied to reduce the purchase price of one or more products on offer. The loyalty offers may also include offers of credits for other loyalty programs. The loyalty credits of one loyalty program may be converted to loyalty credits of another loyalty program, for example, in accordance with a defined rate of credits exchange.

The loyalty system 170 may be communicably connected with computing systems associated with third-party affiliates that support the loyalty programs of loyalty system 170. The loyalty system 170 may obtain product data of rewards (e.g., merchandise, services, etc.) that are offered by the affiliates. In particular, the loyalty system 170 may obtain product data of one or more products for which customers can redeem their loyalty credits. The product data may be obtained by, for example, querying databases associated with the affiliates and/or by using defined API calls for the affiliate systems. The product data may be stored by the loyalty system 170, in some embodiments. The loyalty system 170 may obtain product data from the affiliates periodically or upon request, and updated product data of rewards may be maintained.

The client device 110, the resource server 150, the social networking server 160 and the loyalty system 170 may be in geographically disparate locations. Put differently, the client device 110 may be remote from at least one of the resource server 150, the social networking server 160 and the loyalty system 170. As described above, each of the client device 110, the resource server 150, the social networking server 160 and the loyalty system 170 may be a computer system.

The network 130 is a computer network. In some embodiments, the network 130 may be an internetwork such as may be formed of one or more interconnected computer networks. For example, the network 130 may be or may include an Ethernet network, an asynchronous transfer mode (ATM) network, a wireless network, or the like. Additionally, or alternatively, the network 130 may be or may include one or more payment networks. The network 130 may, in some embodiments, include a plurality of distinct networks. For example, communications between certain of the computer systems may be over a private network whereas communications between other of the computer systems may be over a public network, such as the Internet.

Figure 2A:
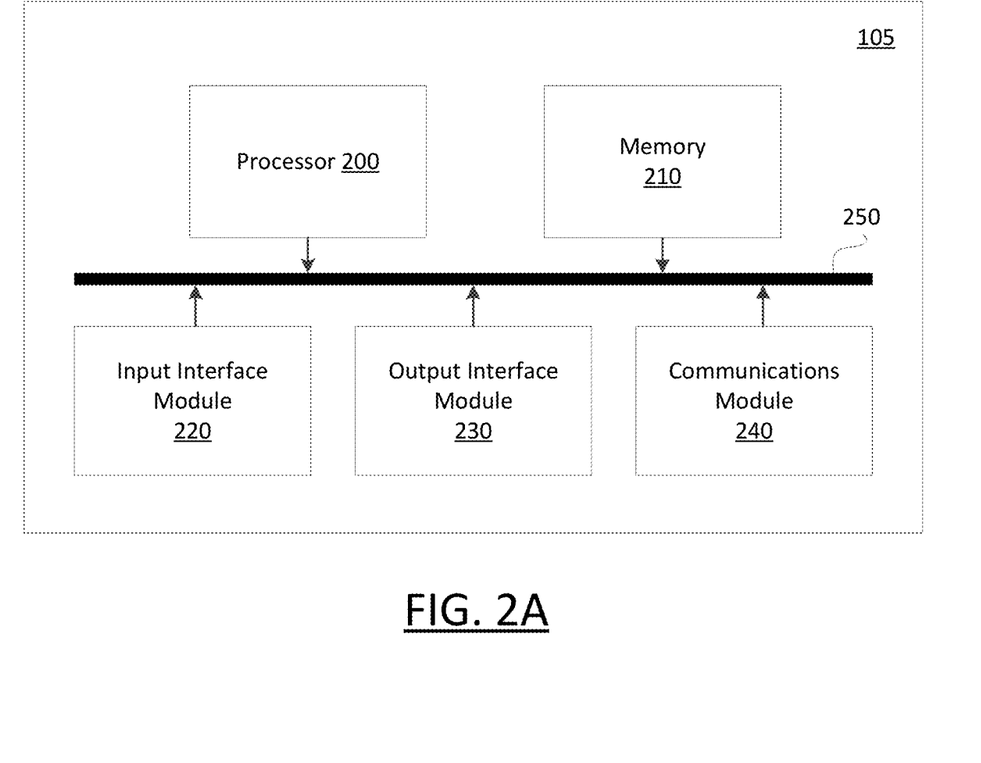
FIG. 2A is high-level schematic diagram of a computing device.

FIG. 2A is a high-level operation diagram of an example computing device 105. In at least some embodiments, the example computing device 105 may be exemplary of one or more of the client device 110, the resource server 150, the social networking server 160 and the loyalty system 170. The example computing device 105 includes a variety of modules. For example, as illustrated, the example computing device 105, may include a processor 200, a memory 210, an input interface module 220, an output interface module 230, and a communications module 240. As illustrated, the foregoing example modules of the example computing device 105 are in communication over a bus 250.

The processor 200 is a hardware processor. Processor 200 may, for example, be one or more ARM, Intel x86, PowerPC processors or the like.

The memory 210 allows data to be stored and retrieved. The memory 210 may include, for example, random access memory, read-only memory, and persistent storage. Persistent storage may be, for example, flash memory, a solid-state drive or the like. Read-only memory and persistent storage are a computer-readable medium. A computer-readable medium may be organized using a file system such as may be administered by an operating system governing overall operation of the example computing device 105.

The input interface module 220 allows the example computing device 105 to receive input signals. Input signals may, for example, correspond to input received from a user. The input interface module 220 may serve to interconnect the example computing device 105 with one or more input devices. Input signals may be received from input devices by the input interface module 220. Input devices may, for example, include one or more of a touchscreen input, keyboard, trackball or the like. In some embodiments, all or a portion of the input interface module 220 may be integrated with an input device. For example, the input interface module 220 may be integrated with one of the aforementioned example input devices.

The output interface module 230 allows the example computing device 105 to provide output signals. Some output signals may, for example allow provision of output to a user. The output interface module 230 may serve to interconnect the example computing device 105 with one or more output devices. Output signals may be sent to output devices by output interface module 230. Output devices may include, for example, a display screen such as, for example, a liquid crystal display (LCD), a touchscreen display. Additionally, or alternatively, output devices may include devices other than screens such as, for example, a speaker, indicator lamps (such as for, example, light-emitting diodes (LEDs)), and printers. In some embodiments, all or a portion of the output interface module 230 may be integrated with an output device. For example, the output interface module 230 may be integrated with one of the aforementioned example output devices.

The communications module 240 allows the example computing device 105 to communicate with other electronic devices and/or various communications networks. For example, the communications module 240 may allow the example computing device 105 to send or receive communications signals. Communications signals may be sent or received according to one or more protocols or according to one or more standards. For example, the communications module 240 may allow the example computing device 105 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally, or alternatively, the communications module 240 may allow the example computing device 105 to communicate using near-field communication (NFC), via Wi-Fi™, using Bluetooth™ or via some combination of one or more networks or protocols. Contactless payments may be made using NFC. In some embodiments, all or a portion of the communications module 240 may be integrated into a component of the example computing device 105. For example, the communications module may be integrated into a communications chipset.

Software comprising instructions is executed by the processor 200 from a computer-readable medium. For example, software may be loaded into random-access memory from persistent storage of memory 210. Additionally, or alternatively, instructions may be executed by the processor 200 directly from read-only memory of memory 210.

Figure 2B:
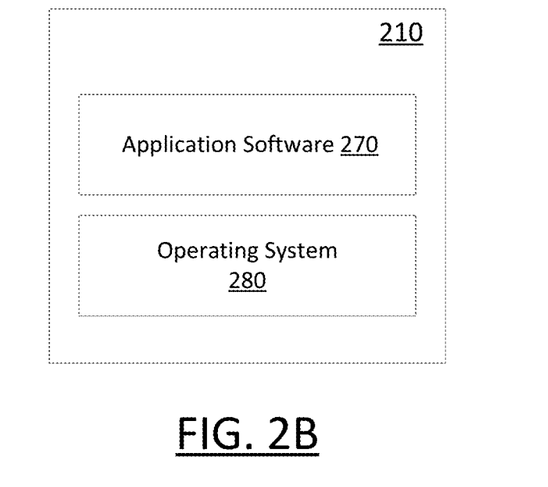
FIG. 2B shows a simplified organization of software components stored in a memory of the computing device of FIG. 2A.

FIG. 2B depicts a simplified organization of software components stored in memory 210 of the example computing device 105. As illustrated, these software components include an operating system 280 and application software 270.

The operating system 280 is software. The operating system 280 allows the application software 270 to access the processor 200, the memory 210, the input interface module 220, the output interface module 230 and the communications module 240. The operating system 280 may be, for example, Apple iOS™, Google™ Android™, Linux™, Microsoft™ Windows™, or the like.

The application software 270 adapts the example computing device 105, in combination with the operating system 280, to operate as a device performing particular functions. For example, the application software 270 may cooperate with the operating system 280 to adapt a suitable embodiment of the example computing device 105 to operate as the client device 110, the resource server 150, the social networking server 160 or the loyalty system 170. The application software 270 may, for example, include a resource account management application. In some example implementations, a resource account management application may allow users to access and control various aspects of their accounts, for example, at a resource server. For example, the resource account management application may comprise a mobile banking application for managing personal or business bank accounts. A resource account management application may provide a functionality of managing features of value transfer cards that are associated with resource accounts (and data records of those resource accounts). In particular, customers of a financial institution may use a resource account management application on their devices to access card data of their value transfer cards, such as current balance, transactions history, accumulated loyalty credits, etc.

While a single application software 270 is illustrated in FIG. 2B, in operation, the memory 210 may include more than one application software 270 and different application software 270 may perform different operations.

Figure 3:
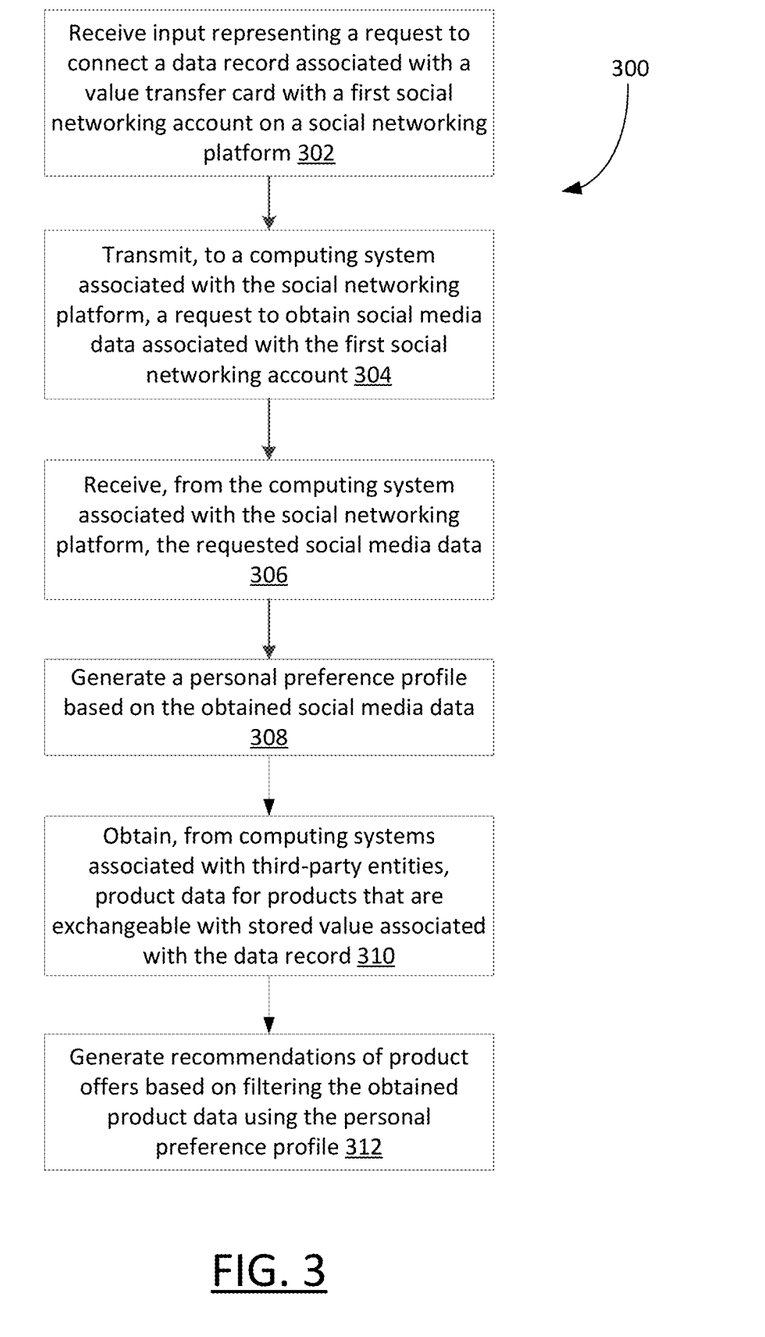
FIG. 3 shows, in flowchart form, an example method for providing recommendations of product offers in connection with a value transfer card.

Reference is now made to FIG. 3 which shows, in flowchart form, an example method 300 for providing recommendations of product offers in connection with a value transfer card. The method 300 may be implemented by a computing system that implements or has access to a loyalty system for administering loyalty programs associated with a plurality of resource accounts. In particular, the computing system may be configured to access and manage loyalty program account data associated with one or more value transfer cards.

For example, the method 300 may be implemented by a standalone computing system, such as the loyalty system 170 of FIG. 1, that is configured for performing functions relating to administering loyalty programs. As another example, the method 300 may be implemented by a resource account management system, such as the resource server 150 of FIG. 1, that is configured to integrate loyalty system functionalities. The operations of method 300 will be described as being implemented by a resource server, without loss of generality. Operations 302 and onward may be performed by one or more processors of a computing device such as, for example, the processor 200 (FIG. 2A) of suitably configured instances of the example computing device 105 (FIG. 2A).

When a customer (i.e., client entity) obtains a new value transfer card that is issued by an issuer entity, the customer may be presented with an option to register or sign up for a loyalty program associated with the value transfer card. The loyalty program may enable the customer to collect loyalty credits in connection with transactions that are conducted using the value transfer card. For example, a loyalty program account may be created for the customer and loyalty credits (or "points") that are accumulated through use of the value transfer card may be credited to the loyalty program account.

In operation 302, the resource server receives input representing a request to connect a data record associated with the value transfer card with a first social networking account on a social networking platform. The input may be received via a client device associated with the customer. For example, the input may comprise user input in a software application (e.g., mobile banking application) that is resident on the customer's device. The request may indicate, at least, identifying information for the data record, which may be a record that is associated with a resource account connected to the value transfer card. In particular, the identifying information may specify a resource account of the cardholder of the value transfer card. For example, the request may indicate a primary account number (PAN), a card number of the value transfer card, and a personal identification number (PIN) associated with the value transfer card.

The request also includes authentication information for the first social networking account. In particular, the request may indicate an identity of the social networking platform and authentication credentials of an entity requesting to connect the data record with the first social networking account. In some embodiments, the input received by the resource server may include a selection of a plurality of social networking platforms. In particular, the resource server may process a request to connect a data record/resource account associated with a value transfer card with multiple social networking accounts.

In operation 304, the resource server transmits, to a computing system associated with the social networking platform, a data request to obtain social media data associated with the first social networking account. More specifically, the resource server generates a data request for obtaining select social media data and transmits the data request to the social networking platform. The data request may be transmitted, for example, using one or more defined API calls for the social networking platform.

The data request may indicate various parameters of social media data that is requested to be obtained from the social networking account. In some embodiments, the data request may specify the types of social media data to retrieve in connection with the first social networking account. The requested social media data may include any one or more of activity log data, contacts data, subscriptions data, or personalized wish list data associated with the first social networking account. In some embodiments, the data request may specify a date range for the requested social media data. In particular, the resource server may request to only receive social media data that is associated with a specific time period. For example, the resource server may request to receive data objects that are tagged with a timestamp falling within a defined date/time range.

Additionally, or alternatively, the data request may indicate other criteria for the requested social media data. In some embodiments, the resource server may request to receive data objects that contain product data of one or more products. For example, the requested social media data may comprise data objects that are tagged with product identifying information (e.g., product type, brand name, retailer, price, etc.). In particular, the requested social media data objects may be those objects containing product- and/or product attribute-related metadata.

In operation 306, the resource server receives, from the computing system associated with the social networking platform, the requested social media data. That is, the resource server receives a response to the data request. For example, the social media data may be received as results of a query that is submitted by the resource server to the social networking system(s).

The resource server then generates a personal preference profile based on the obtained social media data, in operation 308. A personal preference profile is a data representation of an individual's preference information. More specifically, a personal preference profile of a customer models the customer's preferences (e.g., interests, affinities, etc.) in relation to products, such as merchandise and services. In particular, a customer's personal preference profile may indicate the preferences of the customer with respect to particular categories of products. A customer's product preferences may be determined based on, at least, social media data of the customer provided by one or more social networking platforms. By assessing, for example, social media activities, profile information, and account status of the customer on various different social networking platforms, the customer's preferences with respect to products and/or product categories can be modelled.

The personal preference profile may indicate specific products that the customer prefers or is interested in. In some embodiments, the personal preference profile may include product data of preferred products for the customer. For example, the social media data associated with the customer's social networking account may include wish lists itemizing goods or services that the customer desires. The wish list and its contents may be incorporated into the personal preference profile of the customer. Similarly, various other social media data objects that are tagged with product data (e.g., product identifying information, such as brand, product name, etc.) may be included in the customer's personal preference profile.

In at least some embodiments, the personal preference profile of a customer may include a list of product attributes for which the customer has indicated a preference. The product attributes are characteristics that define a particular product. A product attribute may be, for example, size, color, flavor, packaging type, manufacturer, brand, sub-brand, product category, design, weight, material of composition, and the like. The personal preference profile may identify an attribute preference score for one or more of the product attributes. The attribute preference score may, for example, be a numerical score that represents the customer's affinity level for a product attribute. In some embodiments, the product attributes included in the personal preference profile may be ordered in accordance with the respective preference scores of the product attributes. In this way, the product attributes that are associated with higher priority or affinity level for a customer may be discernible from the customer's personal preference profile.

As explained above, loyalty credits may be accumulated by a customer through use of the value transfer card that is linked to the data record/resource account. In order to track the accumulated loyalty credits, a value reflecting a current quantity of loyalty credits associated with the value transfer card may be stored and maintained. The stored value may be updated as the value transfer card is used (e.g., for transactions).

In operation 310, the resource server obtains, from computing systems associated with one or more third-party affiliate entities, product data for products that are exchangeable with the stored value associated with the data record. That is, the resource server obtains product data for products that are offered by affiliate entities and for which loyalty credits (represented by the stored value) can be redeemed.

In at least some embodiments, the product data may be provided, by affiliate entities, in the form of product catalogs containing product information for a plurality of products that are designated by the affiliate entities as being exchangeable, in whole or in part, with the stored value. The product data may include indications of product attributes (e.g., manufacturer, brand, color, size, etc.), price (e.g., regular price, sale price), available stock, and quantity of loyalty credits that can be applied to purchase of the product.

In operation 312, the resource server generates recommendations of product offers for the customer. The recommendations are generated based on filtering the obtained product data using the personal preference profile. In particular, the product data obtained from affiliate entities is processed and a subset of the product data may be identified based on product preference information contained in the personal preference profile. For example, a subset of the set of all products offered by affiliate entities may be selected and offers for the selected products may be provided as recommendations to the customer.

In some embodiments, the selection of recommended products may be made by assigning, for each of one or more of the products offered by the affiliate entities, a product preference score. A product preference score may represent an estimate of the customer's preference for the product based on the personal preference profile of the customer. The product preference score for a product may be determined in various different ways. In some embodiments, an affinity value may be assigned to each of one or more attributes of a product, where the affinity value represents the customer's affinity for an attribute. The product preference score for the product may be determined based on the assigned affinity values for the attributes. For example, a weighted sum of the assigned values of a product's attributes may be computed and set as the product preference score for the product. The weights may, for example, correspond to attribute preference scores for the attributes as indicated in the personal preference profile of the customer. In this way, the product preference score may reflect the relative importance of each of the product attributes for the customer.

A higher product preference score may indicate a higher level of customer's affinity for a product. In particular, a higher product preference score may represent a higher probability that the customer/cardholder desires the product and/or that the customer has greater preference for the product compared to a product having a lower product preference score. The selected subset of recommended products may include only those products having a product preference score that exceeds a defined threshold. Additionally, or alternatively, the selected subset of products may include a defined number of the offered products that have the highest product preference scores.

In some embodiments, the resource server may process all product data obtained from the affiliate entities and determine mechanisms for presenting the product data in order to represent the preference information as indicated in the customer's personal preference profile. That is, rather than filtering the product data and identifying only a subset of recommended products, the recommendations data may comprise product data for all products and instructions for presenting the product data in a way that represents the customer's relative preferences for the products. For example, the resource server may determine an order associated with all of the products on offer from the affiliate entities, where the order is determined based on the customer's preference information.

The recommendations of product offers may be provided via a client device associated with the customer. In some embodiments, the recommendations may be provided in a graphical user interface associated with an application, such as a mobile or web application, for accessing account data for the customer's loyalty program account. In particular, a customer may access, via a user interface of an application on the customer's device, product information of a plurality of products for which their loyalty credits can be redeemed, and the recommended product offers data may be presented with or as part of the product information. For example, the recommended product offers may include offers for a subset of products that are associated with highest levels of preference for the customer, and the offers may be displayed on the user interface.

The display of the recommended product offers may be distinguished from display of other products that are offered by affiliate entities of the loyalty program. In particular, the recommended product offers may be displayed differently than other products on offer for exchanging with the stored value associated with the data record. For example, the recommended product offers may be displayed in a region of the graphical user interface that is separated from one or more regions displaying other products. That is, the display of the recommended product offers may be locationally distinct from the display of the other products on the user interface. As another example, the recommended product offers may be prioritized in a display order (i.e., displayed with higher priority) of a listing of all products offered by affiliate entities for exchange with the stored value.

Additionally, or alternatively, the recommendations may be provided as notifications on the customer's device. In some embodiments, the recommended product offers may be included in push notifications provided by the client's device. The push notifications may be provided, for example, in response to detecting one or more defined trigger conditions. In particular, the resource server may detect a trigger condition associated with one or more products of the selected subset of products (i.e., recommended product) and in response to detecting the trigger condition, the recommendations of product offers may be provided on the customer's device. The trigger condition may, for example, be a change in a product attribute associated with one or more of the selected products. As another example, the trigger condition may be an event (e.g., sale) that is detected in connection with one or more of the selected products.

Figure 4:
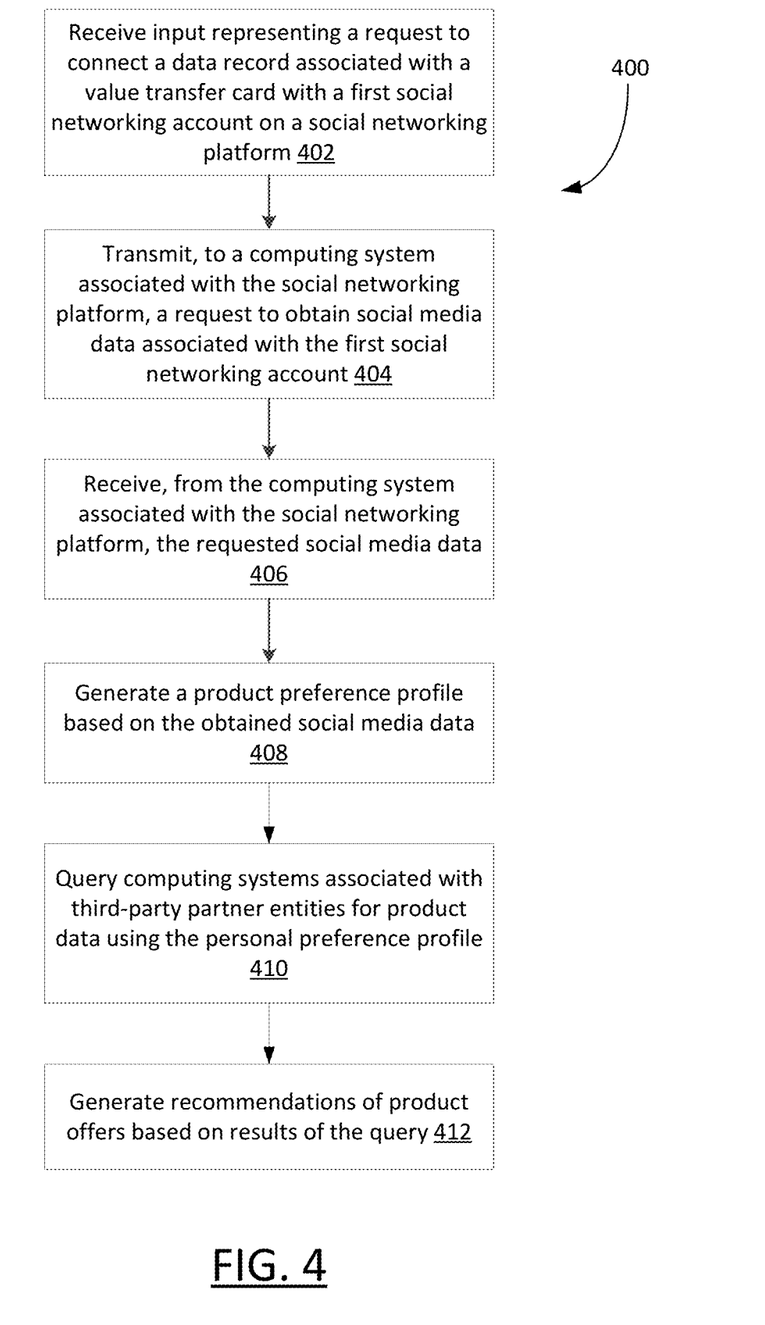
FIG. 4 shows, in flowchart form, another example method for providing recommendations of product offers in connection with a value transfer card.

Reference is now made to FIG. 4 which shows, in flowchart form, another example method 400 for providing recommendations of product offers in connection with a value transfer card. The method 400 may be implemented by a computing system that implements or has access to a loyalty system for administering loyalty programs associated with a plurality of resource accounts. In particular, the computing system may be configured to access and manage loyalty program account data associated with one or more value transfer cards.

For example, the method 400 may be implemented by a standalone computing system, such as the loyalty system 170, that is configured for performing functions relating to administering loyalty programs. As another example, the method 400 may be implemented by a resource account management system, such as the resource server 150, that is configured to integrate loyalty system functionalities. The operations of method 400 will be described as being implemented by a resource server, without loss of generality. Operations 402 and onward may be performed by one or more processors of a computing device such as, for example, the processor 200 (FIG. 2A) of suitably configured instances of the example computing device 105 (FIG. 2A). The operations of method 400 may be performed in addition to, or as alternatives of, one or more of the operations of method 300.

Operations 402, 404, 406 and 408 correspond to operations 302, 304, 306 and 408 of method 300, and may be performed in similar manner as described above with reference to FIG. 3. In operation 402, the resource server receives input representing a request to connect a data record (or resource account) associated with a value transfer card with a first social networking account. The resource server transmits, to a computing system associated with the relevant social networking platform, a data request to obtain social media data associated with the first social networking account, in operation 404. The requested social media data is received from the social networking platform, in operation 406, and a personal preference profile for a customer/client entity associated with the value transfer card is generated in operation 408.

The resource server then obtains product data for products that are exchangeable with stored value associated with the data record. Unlike in method 300, however, the resource server generates specific queries for transmitting to third-party affiliate entities. That is, rather than retrieving product data of all products offered by affiliate entities that are available for exchanging with the stored value, the resource server requests to receive only select product data, in operation 410. This technique of selective retrieval of product data from affiliate entities may help to achieve overall efficiency in data processing for the resource server. For example, selective retrieval may allow for lower bandwidth consumption in transmission of product data and reduced storage requirements for storing the product data.

The queries may be generated using the personal preference profile. More generally, the customer's preference information indicated in the personal preference profile may be used to generate requests to obtain product data from the affiliate entities. In some embodiments, the resource server may identify those product attributes that are preferred by the customer, based on the personal preference profile, and request to obtain product data for only those products that have the same or similar attributes as the identified attributes. The requests may be transmitted, for example, using defined API calls for computing systems associated with the affiliate entities.

Upon receiving the requested product data, the resource server generates recommendations of product offers, in operation 412. For example, the recommendations may be generated based on results of the one or more queries to the affiliate entities for obtaining product data for select products. The recommendations may be provided to the customer in a similar manner as described above with respect to operation 312 of method 300. In particular, the recommendations may be provided via notifications (e.g., push notifications) or as part of display data for a graphical user interface on a device of the customer.

Figure 5:
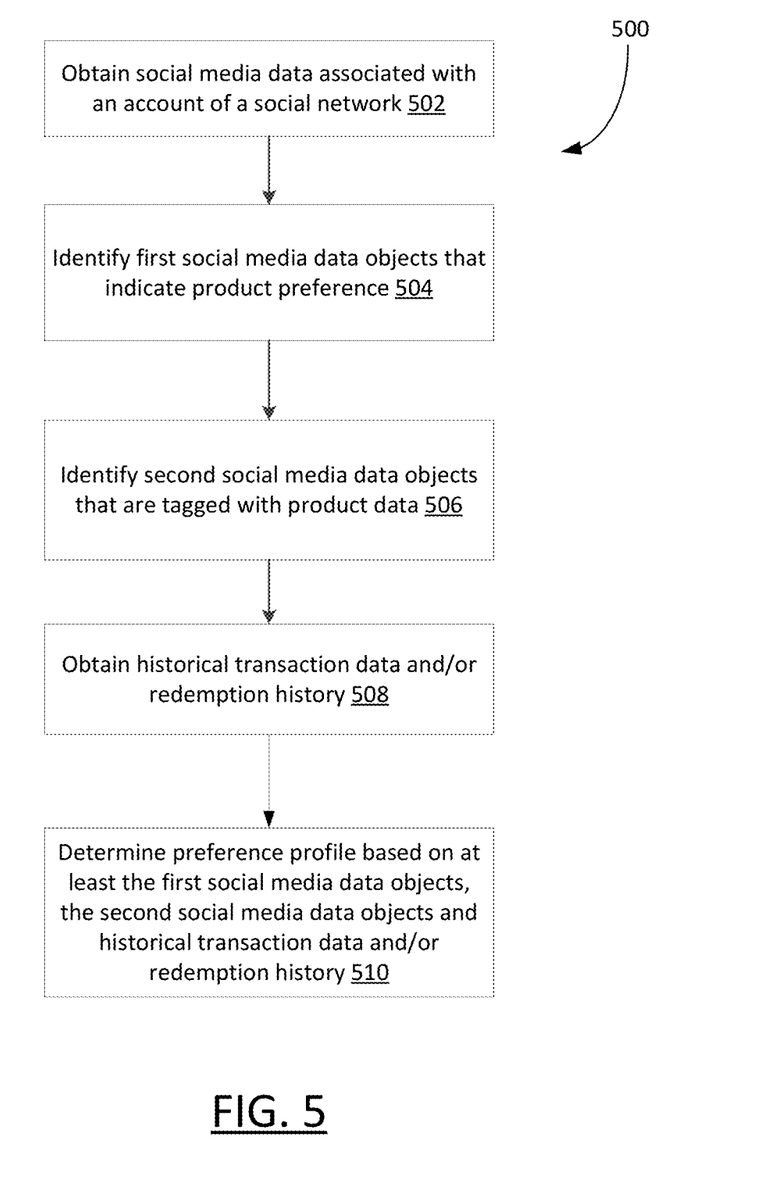
FIG. 5 shows, in flowchart form, an example method for generating a personal preference profile of an entity associated with a value transfer card.

Reference is now made to FIG. 5 which shows, in flowchart form, an example method 500 for generating a personal preference profile of an entity associated with a value transfer card. More specifically, a personal preference profile may be generated based on social media data for a social networking account of the entity, in accordance with method 500. The method 500 may be implemented by a computing system that implements or has access to a loyalty system for administering loyalty programs associated with a plurality of resource accounts. In particular, the computing system may be configured to access and manage loyalty program account data associated with one or more value transfer cards.

For example, the method 500 may be implemented by a standalone system, such as the loyalty system 170, that is configured for performing functions relating to loyalty programs. As another example, the method 500 may be implemented by a resource account management system, such as the resource server 150, that is configured to integrate loyalty system functionalities. The operations of method 500 will be described as being implemented by a loyalty system, without loss of generality. Operations 502 and onward may be performed by one or more processors of a computing device such as, for example, the processor 200 (FIG. 2A) of suitably configured instances of the example computing device 105 (FIG. 2A).

In operation 502, the resource server obtains social media data associated with a social networking account of the entity. The resource server transmits, to one or more social networking platforms, a request to obtain social media data, which may include activity log data, contacts data, etc. The social media data may be obtained, for example, using defined API calls for the relevant social networking platform.

The obtained social media data of the entity's social networking account is processed to identify data that is relevant for building the personal preference profile for the entity. In operation 504, the resource server identifies first social media data objects that indicate product preference. In some embodiments, the first social media data objects may include activity data that represents preferences, such as interest, affinities, and the like, of the entity. The activity data may include, for example, reaction data (e.g., likes), friending and following, posts (e.g., including text, images, etc.), and the like, that relate to products or product attributes. Additionally, or alternatively, the first social media data objects may include those data objects corresponding to social media content, such as posts, shares, etc., that include product- or attribute-related keywords.

In operation 506, the resource server identifies second social media data objects that are tagged with product data. In particular, the second social media data objects may include those data objects containing tags (i.e., metadata) that relate to product or product attribute information. The tags may be keywords or terms that are included in a defined set of product-related keywords or terms. For example, the resource server may store and/or access a database of product-related keywords, and the second social media data objects may be identified based on the defined keywords of the database.

In at least some embodiments, the personal preference profile of an entity may be generated based on at least one of historical transaction data associated with the value transfer card or value-to-product exchange (e.g., redemption) history associated with the data record. In operation 508, the resource server obtains the historical transaction data and/or the redemption history. For example, the resource server may obtain a historical log of transactions that are conducted using the value transfer card. In particular, the historical transaction data may be associated with a specific data record/resource account, connected to the value transfer card, that is managed by the resource server. In at least some embodiments, the redemption history may be associated with a loyalty program account associated with the value transfer card. The redemption history may, for example, be associated with a resource account connected to the value transfer card. The redemption history indicates details of past redemptions of loyalty credits for products (e.g., goods, services, etc.) or conversions to credits associated with other loyalty programs.

The resource server builds the personal preference profile of the entity based on, at least, the first social media data objects, the second social media data objects, and one or both of the historical transaction data and the redemption history associated with the value transfer card, in operation 510. The personal preference profile may be stored, by the resource server, in association with the entity, the value transfer card, and/or the loyalty program account of the linked to the value transfer card.

Figure 6:
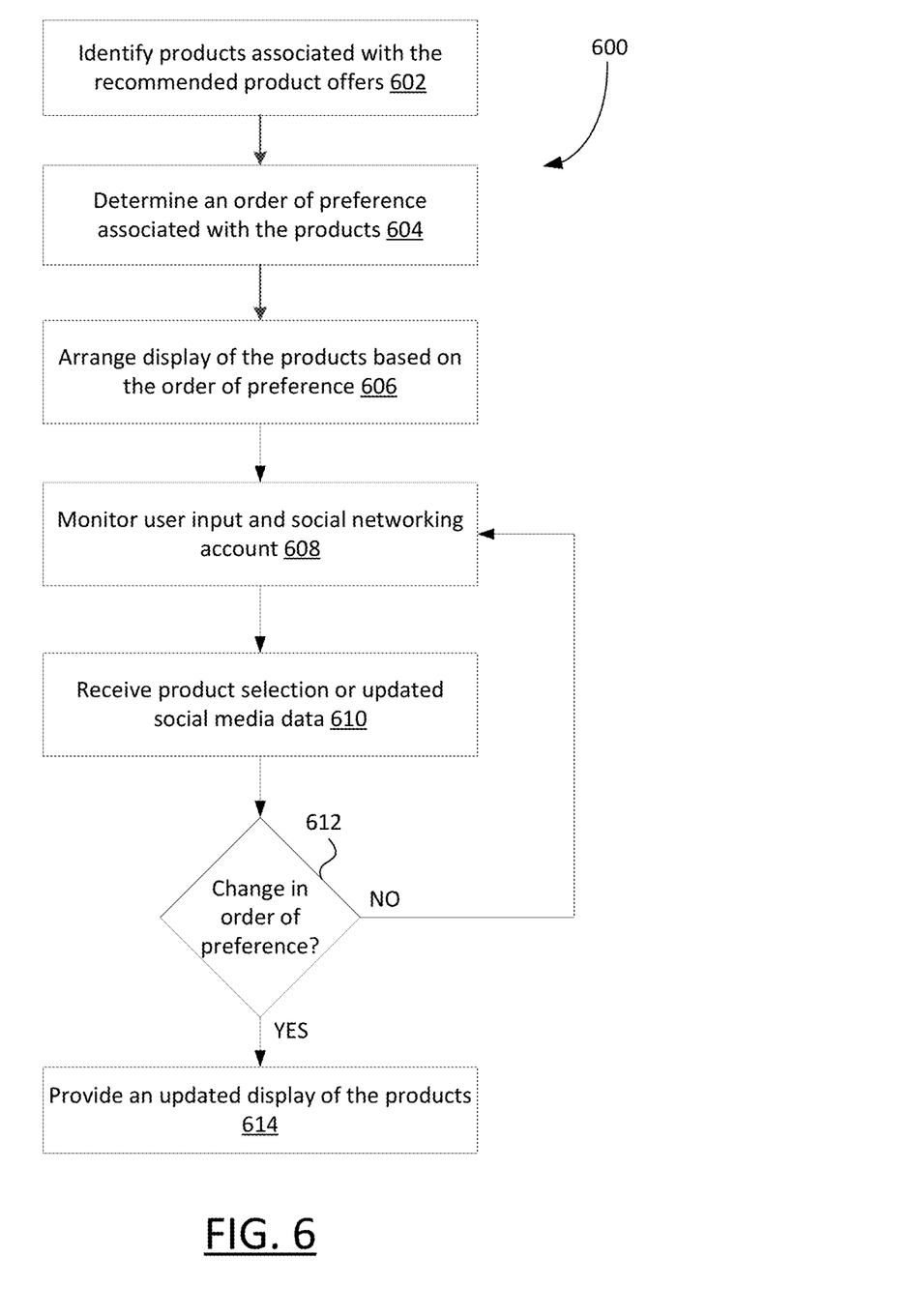
FIG. 6 shows, in flowchart form, an example method for displaying product offer data in a user interface accessible on a client device.

Reference is now made to FIG. 6 which shows, in flowchart form, an example method 600 for displaying product offer data in a user interface that is accessible via a client device. More specifically, product offer data of products for which loyalty credits associated with a value transfer card are redeemable may be displayed, in accordance with method 600. The method 600 may be implemented by a computing system that implements or has access to a loyalty system for administering loyalty programs associated with a plurality of resource accounts. In particular, the computing system may be configured to access and manage loyalty program account data associated with one or more value transfer cards.

For example, the method 600 may be implemented by a standalone system, such as the loyalty system 170, that is configured for performing functions relating to loyalty programs. As another example, the method 600 may be implemented by a resource account management system, such as the resource server 150, that is configured to integrate loyalty system functionalities. The operations of method 600 will be described as being implemented by a loyalty system, without loss of generality. Operations 602 and onward may be performed by one or more processors of a computing device such as, for example, the processor 200 (FIG. 2A) of suitably configured instances of the example computing device 105 (FIG. 2A). The operations of method 600 may be performed in addition to, or as alternatives of, one or more operations of methods 300, 400 and 500.

In operation 602, the resource server identifies a plurality of products that are exchangeable with stored value (e.g., loyalty credits) associated with a data record connected to the value transfer card. The plurality of products may include those products that are offered by third-party affiliate entities as rewards of a loyalty program associated with the value transfer card.

The resource server determines an order of preference associated with the plurality of products, in operation 604. The order may be determined, for example, using a personal preference profile of the cardholder. For example, a product preference score (described above) may be assigned to each of the plurality of products, and the order may be determined based on the respective product preference scores. In particular, the order may be determined based on, at least, social media data for one or more social networking accounts associated with the cardholder.

In operation 606, the resource server presents a display of the plurality of products based on the determined order of preference. In particular, the plurality of products may be displayed on a device associated with the cardholder in accordance with the order of preference. For example, a listing of the products may be displayed, where the products are initially ordered according to the determined order of preference. In some embodiments, a product comparison view for comparing select ones of the plurality of products may be presented on a cardholder's device.

The resource server monitors user input and social networking accounts associated with the cardholder (operation 608). Upon receiving either a user selection of one of the plurality of products or updated social media data for the cardholder (operation 610), the resource server determines whether there is a change in order of preference of the plurality of products (operation 612). A product selection or updated (e.g., more recent) social media data may indicate the cardholder's preference for a certain product and may thus alter the cardholder's order of preference for the plurality of products on offer. For example, a selection by the cardholder from a product catalog associated with the loyalty program of the value transfer card may indicate preference for the selected product and/or product attributes associated with the selected product. Similarly, social media data (e.g., activity log data, status data, etc.) may include indication of the cardholder's preference for certain products and/or product attributes. The additional information received by means of the user selection input or social media data may be used to obtain an updated order of preference of the product offers. For example, updated product preference scores may be assigned to the products on offer.

If the order is revised, the display of the products on the cardholder's device is updated to represent the revised order of preference, in operation 614. More generally, the product recommendation data associated with a loyalty program account of the cardholder may be updated based on one or both of user interaction (e.g., click, page visit, etc.) for accessing select ones of the plurality of products (i.e., to browse, purchase, redeem etc.) or updated social media data associated with the cardholder's social networking accounts. The display of recommended product offer data may be automatically updated in real-time (or near real-time), or in response to express request by the cardholder (e.g., cardholder launching or refreshing a product display page/view).

Figure 7:
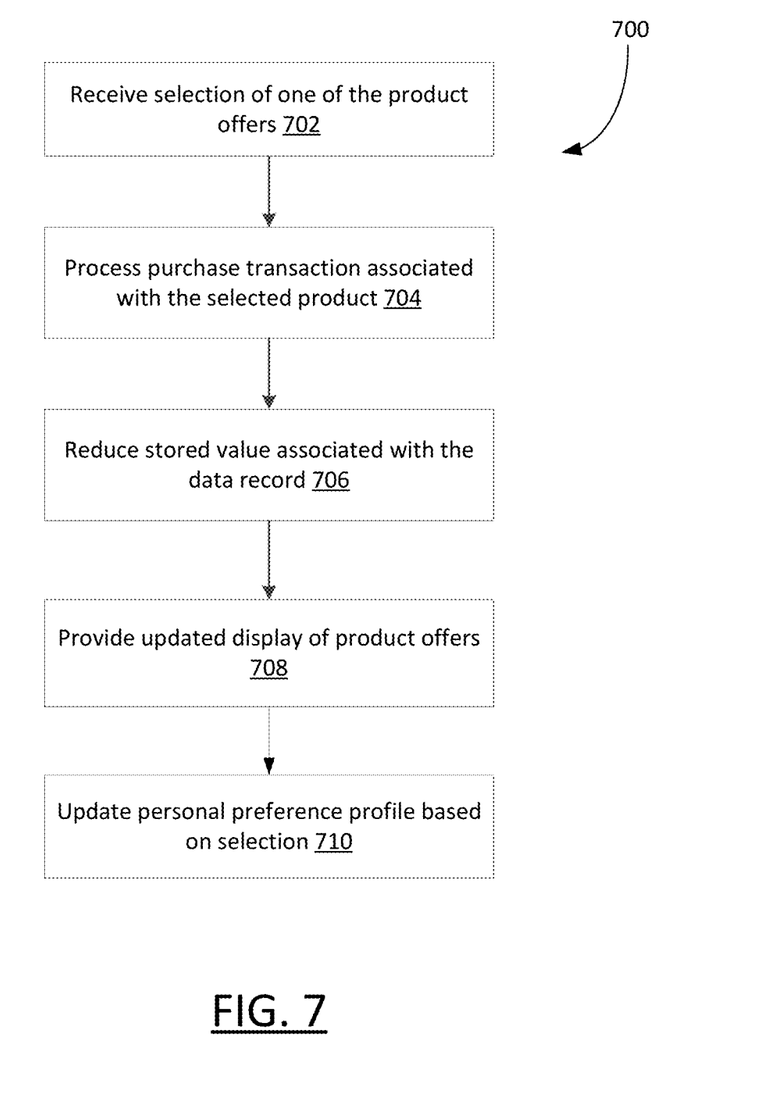
FIG. 7 shows, in flowchart form, an example method for handling selection of one or more product offers in connection with a value transfer card.

Reference is now made to FIG. 7 which shows, in flowchart form, an example method 700 for handling selection of one or more product offers in connection with a value transfer card. More specifically, product offers selections for a loyalty program associated with the value transfer card may be processed, in accordance with method 700. The method 700 may be implemented by a computing system that implements or has access to a loyalty system for administering loyalty programs associated with a plurality of resource accounts. In particular, the computing system may be configured to access and manage loyalty program account data associated with one or more value transfer cards.

For example, the method 700 may be implemented by a standalone system, such as the loyalty system 170, that is configured for performing functions relating to loyalty programs. As another example, the method 700 may be implemented by a resource account management system, such as the resource server 150, that is configured to integrate loyalty system functionalities. The operations of method 700 will be described as being implemented by a loyalty system, without loss of generality. Operations 702 and onward may be performed by one or more processors of a computing device such as, for example, the processor 200 (FIG. 2A) of suitably configured instances of the example computing device 105 (FIG. 2A).

In operation 702, the resource server receives selection of one of the product offers of a loyalty program. The product offers correspond to rewards (e.g., goods, services) of the loyalty program which are provided by third-party affiliate entities. In particular, the product offers may include those products that are recommended for a cardholder of the value transfer card, in accordance with embodiments disclosed herein.

The resource server processes a purchase transaction in connection with the selected product offer, in operation 704. That is, once the product offer is selected, a purchase transaction in connection with the selected product is initiated. For example, the selection of the product offer may be included in a transaction processing request that is transmitted to a third-party server, which may be the affiliate entity server, a payment processing server, or a payment gateway. The transaction processing request may additionally indicate identifying information of the cardholder and a source of the transaction, e.g., the loyalty program associated with the value transfer card.

Once the purchase transaction is successfully processed, the resource server causes the stored value (i.e., quantity of loyalty credits) associated with the data record to be reduced, in operation 706. In particular, the stored value is reduced by an amount that represents a quantity of loyalty credits applied toward the purchase transaction. The updated value may be stored in association with the value transfer card, for example, in a loyalty program account for the cardholder.

In operation 708, the resource server provides an updated display of product offers. The updated display may, for example, display only those products that are available for redemption using the reduced quantity of loyalty credits remaining after the purchase transaction of the selected product. In operation 710, the personal preference profile of the cardholder is updated. In particular, the personal preference profile is updated to reflect the cardholder's selection (and purchase) of the product offer. For example, the cardholder's preference for the selected product and/or one or more product attributes associated with the selected product may be indicated in the personal preference profile.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A computing device, comprising:
 a processor; and
 a memory coupled to the processor, the memory storing instructions that, when executed, configure the processor to:
  receive input representing a request to connect a data record associated with a value transfer card with a first social networking account on a social networking platform, the request including user authentication information for the first social networking account;
  transmit, to a computing system associated with the social networking platform, a request to obtain social media data objects that are tagged with product-identifying information associated with the first social networking account;
  receive, from the computing system associated with the social networking platform, the requested social media data objects;
  generate a personal preference profile that includes social media data objects tagged with product data, the personal preference profile modeling user preference in relation to products;

obtain, from computing systems associated with one or more third-party affiliate entities, product data for first products, the obtaining including:
  generating queries for requesting, from the one or more third-party affiliate entities, product data of select products that are exchangeable with stored value associated with the data record using product attributes identified as preferred based on the personal preference profile to obtain product data of only those products having same or similar attributes as the identified product attributes; and
  transmitting the queries using defined application programming interface (API) calls for computing systems associated with the one or more third-party affiliate entities; and
provide, to a client device associated with the data record, notifications including recommendations of product offers responsive to detecting at least one trigger condition associated with one or more of the first products.

2. The computing device of claim 1, wherein the social media data objects include at least one of activity log data, contacts data, subscriptions data, or personalized wish list data and wherein the personal preference profile is generated based on product preference information indicated in the social media data objects.

3. The computing device of claim 1, wherein the instructions, when executed, further configure the processor to select a subset of the first products based on assigning, for each of one or more of the first products, a preference score representing a preference for the product based on the personal preference profile.

4. The computing device of claim 1, wherein detecting the at least one trigger condition comprises detecting that a product attribute associated with one of the first products has changed.

5. The computing device of claim 1, wherein detecting the at least one trigger condition comprises detecting a sale condition associated with one of the first products.

6. The computing device of claim 1, wherein the personal preference profile is generated based on at least one of historical transaction data associated with the value transfer card or value-to-product exchange history associated with the data record.

7. The computing device of claim 1, wherein the instructions, when executed, further configure the processor to:
  identify a plurality of products that are exchangeable with stored value associated with the data record; and
  present, on a client device associated with the data record, a product comparison view for comparing the identified plurality of products.

8. The computing device of claim 7, wherein presenting the product comparison view comprises arranging a display of the plurality of products based on an order of preference associated with the plurality of products.

9. A computer-implemented method, comprising:
  receiving input representing a request to connect a data record associated with a value transfer card with a first social networking account on a social networking platform, the request including user authentication information for the first social networking account;
  transmitting, to a computing system associated with the social networking platform, a request to obtain social media data objects that are tagged with product-identifying information associated with the first social networking account;
  receiving, from the computing system associated with the social networking platform, the requested social media data objects;
  generating a personal preference profile that includes social media data objects tagged with product data, the personal preference profile modeling user preference in relation to products;
  obtaining, from computing systems associated with one or more third-party affiliate entities, product data for first products, the obtaining including:
    generating queries for requesting, from the one or more third-party affiliate entities, product data of select products that are exchangeable with stored value associated with the data record using product attributes identified as preferred based on the personal preference profile to obtain product data of only those products having same or similar attributes as the identified product attributes; and
    transmitting the queries using defined application programming interface (API) calls for computing systems associated with the one or more third-party affiliate entities; and
  providing, to a client device associated with the data record, notifications including recommendations of product offers responsive to detecting at least one trigger condition associated with one or more of the first products.

10. The method of claim 9, wherein the social media data objects include at least one of activity log data, contacts data, subscriptions data, or personalized wish list data and wherein the personal preference profile is generated based on product preference information indicated in the social media data objects.

11. The method of claim 9, further comprising selecting a subset of the first products based on assigning, for each of one or more of the first products, a preference score representing a preference for the product based on the personal preference profile.

12. The method of claim 9, wherein detecting the at least one trigger condition comprises detecting that a product attribute associated with one of the first products has changed.

13. The method of claim 9, wherein detecting the at least one trigger condition comprises detecting a sale condition associated with one of the first products.

14. The method of claim 9, wherein the personal preference profile is generated based on at least one of historical transaction data associated with the value transfer card or value-to-product exchange history associated with the value transfer card.

15. The method of claim 9, further comprising:
  identifying a plurality of products that are exchangeable with stored value associated with the data record; and
  presenting, on a client device associated with the data record, a product comparison view for comparing the identified plurality of products.

16. The method of claim 15, wherein presenting the product comparison view comprises arranging a display of the plurality of products based on an order of preference associated with the plurality of products.

* * * * *